(12) United States Patent
Eguchi et al.

(10) Patent No.: US 7,612,542 B2
(45) Date of Patent: Nov. 3, 2009

(54) POWER UNIT

(75) Inventors: Hiroyuki Eguchi, Wako (JP); Motohiro Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 11/661,653

(22) PCT Filed: Aug. 5, 2005

(86) PCT No.: PCT/JP2005/014394

§ 371 (c)(1),
(2), (4) Date: Mar. 1, 2007

(87) PCT Pub. No.: WO2006/027917

PCT Pub. Date: Mar. 16, 2006

(65) Prior Publication Data

US 2008/0068870 A1    Mar. 20, 2008

(30) Foreign Application Priority Data

Sep. 6, 2004    (JP) .............................. 2004-258360

(51) Int. Cl.
*G05F 1/00*    (2006.01)
(52) U.S. Cl. ...................................... 323/222; 323/283
(58) Field of Classification Search ................. 323/222, 323/283, 284

See application file for complete search history.

(56) References Cited

U.S. PATENT DOCUMENTS 5,687,070 A * 11/1997 Jacobs et al. ................. 363/126

(Continued)

FOREIGN PATENT DOCUMENTS

JP    11-4506 A    1/1999

(Continued)

OTHER PUBLICATIONS

International Search Report of PCT/JP2005/014394, date of mailing Sep. 27, 2005.

(Continued)

*Primary Examiner*—Shawn Riley
(74) *Attorney, Agent, or Firm*—Westerman, Hattori, Daniels & Adrian, LLP

(57) ABSTRACT

This invention realizes control without using a current-detecting element to prevent over current from flowing into a switching element of a switching converter in response to an input primary voltage from a small-capacity DC power source. The switching converter includes an FET 30 that turns the input primary voltage from the DC power source 1 on and off, and a choke coil 31 that is charged or discharged according to turning on/off of this FET 30. A driver 13 drives the FET so that an output voltage detected by an output voltage detector 9 is converged to a target voltage. A means for calculating a current I that flows into the FET 30 based on a duty ratio of the input primary voltage and the FET 30 and the inductance of the choke coil 31. The driver 13 drives the FET 30 at a duty ratio set so as to prevent the estimated current value I from exceeding a permissible current value or stops driving when the estimated current value I is equal to or more than the permissible current value.

11 Claims, 4 Drawing Sheets

U.S. PATENT DOCUMENTS 6,138,042 A * 10/2000 Midya et al. ............... 455/571
7,081,740 B2 * 7/2006 King ........................ 323/222
7,479,774 B2 * 1/2009 Wai et al. .................. 323/284

FOREIGN PATENT DOCUMENTS

| JP | 2001-143890 A | 5/2001 |
| JP | 2002-64976 A | 2/2002 |
| JP | 2003-244941 A | 8/2003 |
| JP | 2004-40858 A | 2/2004 |

OTHER PUBLICATIONS

Translation of International Preliminary Report on Patentability mailed Mar. 29, 2007 of International Application No. PCT/JP2005/014394.

* cited by examiner ed Patent Application No. 2002-64976. However, the
POWER UNIT

TECHNICAL FIELD

The present invention relates to a power unit, specifically, a power unit having a function of protecting a switching element of a switching converter provided for voltage stabilization.

BACKGROUND ART

FIG. 5 is a block diagram showing an example of a conventional power unit constituting a chopper boost regulator including a power line. An input primary voltage from the DC power source 100 is inputted into a switching converter 110.

The switching converter 110 is composed of a switching element 111, a coil 112, a diode 113, and smoothing capacitors 114 and 115. Due to the voltage inputted into the switching converter 110, energy is charged in the coil 112 while the switching element 111 is turned on, and the charged energy is released via the diode 113 while the switching element 111 is turned off. When releasing the energy, this energy is added on the input voltage and causes boosting action. The output of the switching converter 110 is converted into a predetermined alternating current by an inverter 120 and becomes an output of the power unit.

The switching converter of such a power unit is frequently used for maintaining the input voltage of the inverter stable when the DC power source 100 is power DC converted from power generated in an engine generator or is a small-sized fuel cell and the output capacity thereof is comparatively not very high.

Such a switching converter 110 is subjected to the following feedback control for maintaining its output voltage stable. An error amplifier 130 amplifies the deviation between an output voltage Vout of the switching converter 110 and a reference voltage Vref, and a comparator 131 compares this deviation with a predetermined allowable error. Then, a duty ratio (ON time duty ratio) is determined so that the deviation comes in under the allowable error, and according to this duty ratio, the switching element 111 is driven by a switching part 132.

In this duty control, when a protection circuit for the switching element 111 is provided, this protection circuit is required to have a function of protection from an overcurrent while maintaining the output voltage at a predetermined value, that is, without stopping the output. Therefore, not a voltage detection type short-circuit protection circuit but a circuit that limits the operation of the switching element 111 by detecting the energization state of the switching element 111 is needed. Accordingly, in the example of FIG. 5, a current detector 133 and a limiter 134 for limiting the operation of the switching element 111 are provided. The example of the switching converter is disclosed in Japanese Published Unexamined Patent Application Nos. 2002-64976 and 2004-40858, etc.

Patent document 1: JP 2002-64976 A
Patent document 2: JP 2004-40858 A

DISCLOSURE OF THE INVENTION

Problem to be Solved by the Invention

Provision of the current detector causes a loss due to a direct current, and a measure for reducing the loss is also taken in the converter disclosed in Japanese Published Unexamined Patent Application No. 2002-64976. However, the loss is not sufficiently improved, and a current detecting circuit such as a current detector, etc., is necessary, so that the number of parts remarkably increases.

An object of the present invention is to solve the above-described problem and to provide a power unit which can reduce a number of parts and which can stable power supply to a load.

Means for Solving the Problem

To solve the problem, as a first aspect of the present invention, a power unit which has a switching converter that turns on/off an input primary voltage from a DC power source such as an engine-driven generator or a battery by a switching element and adjusts an output voltage by charging or discharging a reactor according to the turning on/off, includes switching means for driving the switching element so as to converge the output voltage value with a target voltage value by detecting the output voltage value, and current value estimating means for estimating a current value flowing in the switching element by using the input primary voltage and a duty ratio of the switching element, wherein based on the estimated current value, the switching element is driven so as to prevent this estimated current value from becoming equal to or more than a predetermined allowable current value.

As a second aspect of the present invention, the switching means is constructed so as to stop the driving of the switching element when the estimated current value becomes equal to or more than the predetermined allowable current value.

As a third aspect of the present invention, the power unit is further composed of an inverter which converts an output voltage of the switching converter into an alternating current with a predetermined frequency and outputs it to the load side.

EFFECT OF THE INVENTION

According to the present invention, a current value flowing in the switching element is estimated from values such as an input primary voltage, a duty ratio, and an inductance, etc., detected by a detection method other than current detection, and based on this estimated current value, the switching element can be driven within the allowable current value, so that the switching element can be protected without providing a current detecting element. A current detecting element is not provided, so that a circuit loss can be reduced more than in the case of providing a current detecting element, and the number of parts can also be reduced.

In particular, according to the present invention, to protect the switching element from an overcurrent, the switching element is controlled so that the estimated current value does not exceed the allowable current value, and when the estimated current value is equal to or more than the allowable current value, the switching element is stopped to drive.

According to the present invention, for example, even in the case of a DC power source such as a power source including an engine generator or a small-sized fuel cell which has a comparatively small output capacitance and is easily influenced by a load connected to an inverter, the input voltage into the inverter can be stabilized by the switching converter. Therefore, stable power supply to the load becomes possible.

DESCRIPTION OF SYMBOLS

1: generator, 2: rectifier circuit (driving inverter), 3: inverse transformer, 3-1: DC regulator, 3-2: inverter, 4: bidirectional DC-DC converter, 4-1: transformer, 5: battery, 6, 7: smoothing capacitor, 9: output voltage detector, 12: duty ratio setting part, 13: switching part, 14: input voltage detector, 30: FET, 31: choke coil

BEST MODE FOR CARRYING OUT THE INVENTION

Figure 2:
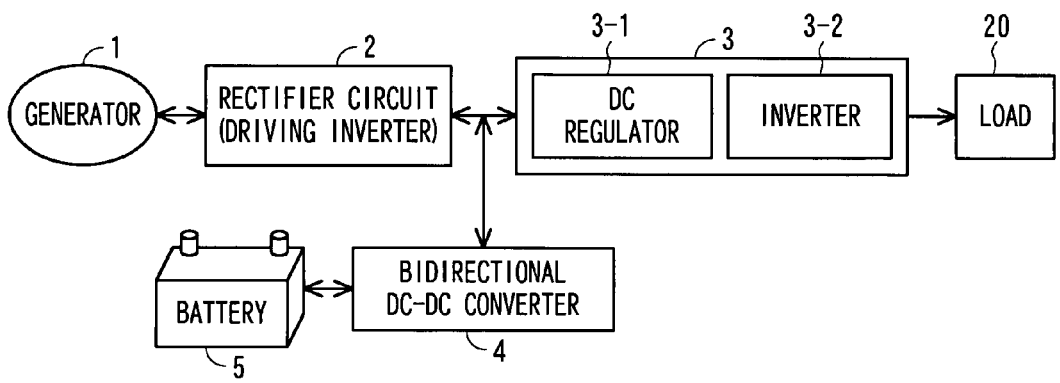
FIG. 2 is a block diagram showing a system configuration of a power unit of the present invention.

The present invention will be described in detail with reference to the drawings. FIG. 2 is a block diagram showing a system configuration of a power unit according to an embodiment of the present invention. Herein, a power unit is embodied as a generation apparatus including a generator. The generator 1 is, for example, a three-phase multipolar magnet engine driven generator whose rotor is driven by an engine that is not shown. The generator 1 can be constructed as a motor-cum-generator which can operate as an engine starting motor.

The rectifier circuit 2 has a bridge-connected rectifier elements and full-wave-rectifies an output of the generator 1. To the rectifier element, switching elements such as FETs are connected in parallel.

These switching elements are controlled so as to drive the generator 1 as a motor when starting a generator engine. By turning on and off the switching elements of the rectifier circuit 2, a DC voltage to be applied from the battery 5 via the bidirectional DC-DC converter 4 can be converted into a three-phase AC voltage and supplied to the generator 1. That is, the rectifier circuit 2 has a function as a driving inverter for a motor.

The inverse transformer 3 has a DC regulator (switching converter) 3-1 and an inverter 3-2, and converts an output of the rectifier circuit 2 into an AC power with a predetermined frequency and outputs it. This switching converter 3-1 has a function to prevent output fluctuations of the generator 1 and the battery 5 from influencing the input voltage of the inverter 3-2. Various loads 20 including a mercury lamp and a motor in which a large current temporarily flows are connected to the inverter 3-2.

The battery 5 is an external DC power source which supplies auxiliary power to the DC power source energized by the power of the generator 1 as appropriate. To boost the voltage of the battery 5 and apply it to the inverse transformer 3, a boost bidirectional DC-DC converter 4 is connected to the output side of the rectifier circuit 2, that is, to the input side of the inverse transformer 3. The bidirectional DC-DC converter 4 has a function of charging the battery 5 by the output of the rectifier circuit 2 when the output of the rectifier circuit 2, that is, the generator output is sufficient and the remaining charge of the battery 5 is low. Hereinafter, the battery 5 side of the bidirectional DC-DC converter 4 may be referred to as a primary side and the rectifier circuit 2 side thereof may be referred to as a secondary side. The battery 5 is, for example, a 12V battery which is generally used for engine starting motors.

Operations of the power unit will be described. The primary side and the secondary side of the bidirectional DC-DC converter 4 are driven by the same drive signal so as to be completely synchronized with each other. By this driving form, the bidirectional DC-DC converter 4 performs bidirectional power conversion as described below.

When starting an engine, based on a relative voltage difference between the primary side and the secondary side due to a transformer turns ratio of the bidirectional DC-DC converter 4, the DC voltage of the battery 5 is boosted by the bidirectional DC-DC converter 4, and the boosted DC voltage is supplied to the driving inverter (rectifier circuit) 2. The driving inverter 2 is switching-driven by a start instruction from a control part that is not shown, and converts the DC voltage into a three-phase AC voltage and supplies it to the generator 1 to start the generator 1 as an engine starting motor.

When the engine starts, the generator 1 is driven by the engine, and the switching operation of the driving inverter 2 is stopped. The output of the generator 1 is rectified by the rectifier circuit (driving inverter) 2 and adjusted in voltage by a switching converter 3-1 of the inverse transformer 3, and further converted into an AC power with a predetermined frequency by the inverter 3-2 and outputted.

When the state is not an overcurrent state, a sufficient output is obtained from the rectifier circuit 2 for the load, and power is supplied only by the generator 1 to the load. At this time, no power is supplied from the battery 5 through the bidirectional DC-DC converter 4.

The bidirectional DC-DC converter 4 is connected to the output side of the rectifier circuit 2, so that if it is not in an overload state and the remaining charge of the battery 5 is low, the battery 5 is charged by the output of the rectifier circuit 2 through the bidirectional DC-DC converter 4. That is, if the converted output of the battery 5 is lower than the output voltage of the rectifier circuit 2, based on a relative voltage difference between the primary side and the secondary side due to a turns ratio of the transformer of the bidirectional DC-DC converter 4, power conversion is performed so that the battery 5 is charged by the output of the rectifier circuit 2.

On the other hand, when the load increases and the output of the generator 1 cannot supply sufficient power to the load, the output of the rectifier circuit 2 lowers. According to this lowering output, power conversion from the primary side to the secondary side of the bidirectional DC-DC converter 4 is performed, and power is supplied from the battery 5 as well. Therefore, when the load increases, the converted output of the battery 5 is added on the converted output of the generator 1, and sufficient power is supplied to the load not only with the generator 1 but also with the battery 5. while the generator 1 stops, the battery 5 can supply power to the load 20 by itself through the bidirectional DC-DC converter 4 and the inverse transformer 3.

Figure 3:
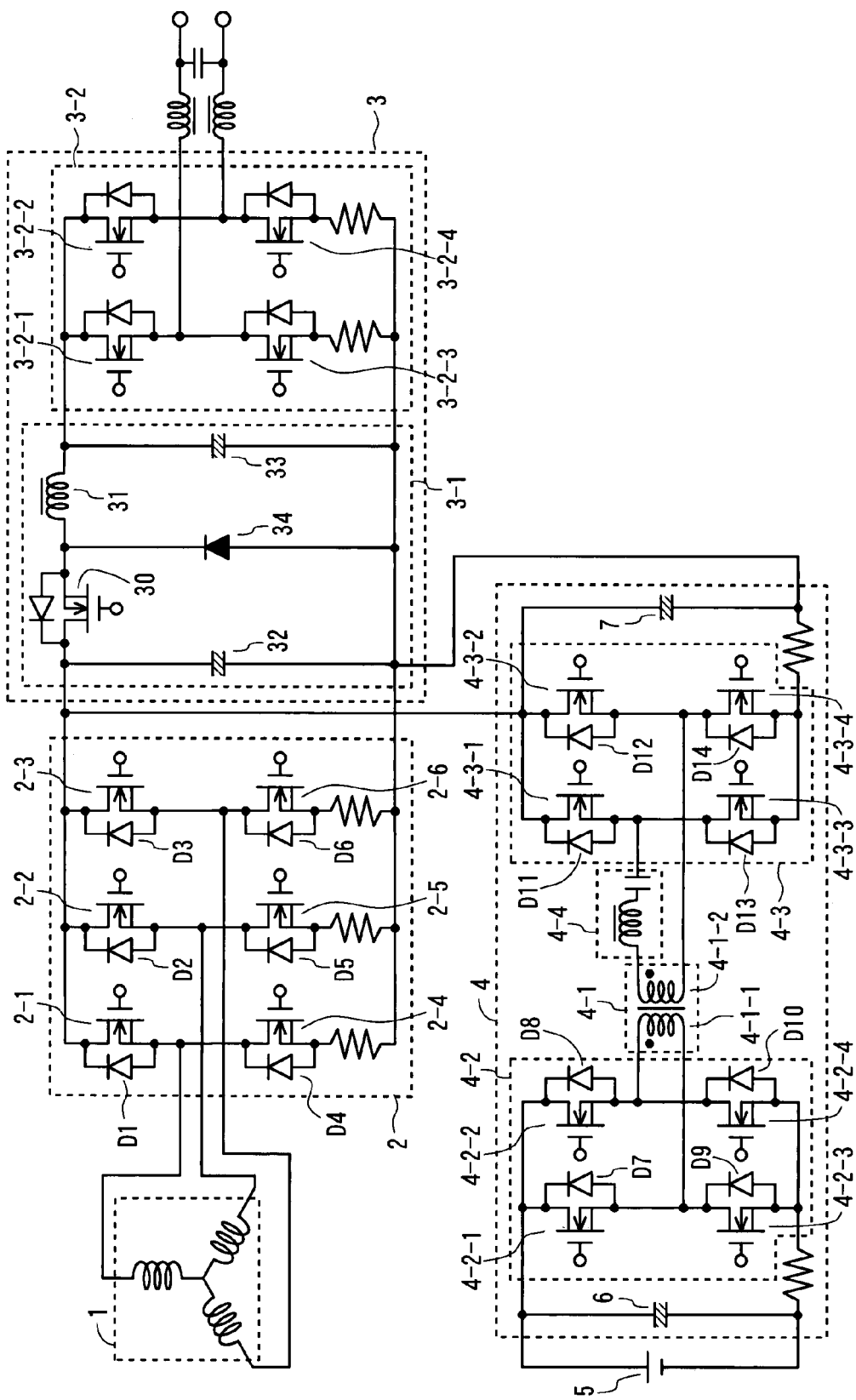
FIG. 3 is a circuit diagram showing a detailed circuit of an embodiment of the power unit of the present invention.

FIG. 3 is a detailed circuit diagram of an embodiment of the power unit of the present invention, and a component identical or equivalent to that in FIG. 2 is attached with the same reference numeral. The three-phase generator 1 is connected to an engine (not shown). The output side of the generator 1 is connected to a driving inverter 2. The driving inverter 2 is constructed by, for example, bridge-connecting six switching elements (hereinafter, referred to as FETs) 2-1 through 2-6 such as FETs.

Rectifier elements D1 through D6 such as diodes are connected to the FETs 2-1 through 2-6 in parallel, respectively, to form a rectifier circuit 2. MOS-FETs are used as the rectifier elements D1 through D6, they may be parasitic diodes which are structurally derived in the MOS-FET structure, or may be diodes separately connected.

The output side of the rectifier circuit 2 is connected to the switching converter 3-1 of the inverse transformer 3. In the example shown in FIG. 3, the switching converter 3-1 is a voltage step-down switching converter and includes, for example, FET 30, a choke coil 31, capacitors 32 and 33, and a diode 34, etc., and the inverter 3-2 is constructed by, for example, bridge-connecting four FETs 3-2-1 through 3-2-4.

The connection point between the rectifier circuit 2 and the inverse transformer 3 is connected to the secondary side of the bidirectional DC-DC converter 4, and the primary side of the DC-DC converter is connected to the battery 5.

The bidirectional DC-DC converter 4 bidirectionally interchanges power between the battery 5 and the output of the rectifier circuit 2, and includes a transformer 4-1 that has a low voltage side coil 4-1-1 on the primary side and a high voltage side coil 4-1-2 on the secondary side. The step-up ratio of the bidirectional DC-DC converter 4 is determined according to the turns ratio of the low voltage side coil 4-1-1 and the high voltage side coil 4-1-2.

A low voltage side switching part 4-2 is inserted into the low voltage side coil 4-1-1 side, and a high voltage side switching part 4-3 is inserted into the high voltage side coil 4-1-2. The low voltage side switching part 4-2 is constructed by, for example, bridge-connecting four FETs 4-2-1 through 4-2-4, and the high voltage side switching part is also similarly constructed by four FETs 4-3-1 through 4-3-4.

To the FETs 4-2-1 through 4-2-4 and 4-3-1 through 4-3-4 of the low voltage side switching part 4-2 and the high voltage side switching part 4-3, rectifier elements D7 through D1 and D11 through D14 such as diodes are connected in parallel, respectively. These rectifier elements D7 through D10 and D11 through D14 may also be FET parasitic diodes, or may be separately connected diodes. By adding the parallel-connected rectifier elements D7 through D10 and D11 through D14, the low voltage side switching part 4-2 and the high voltage side switching part 4-3 can be regarded as switching and rectifying parts, respectively.

An LC resonance circuit 4-4 is inserted to the high voltage side coil 4-1-2 side of the transformer 4-1. The LC resonance circuit 4-4 functions to shape the form of a current flowing when at least one of the low voltage side switching part 4-2 and the high voltage side switching part 4-3 is driven into a sinusoidal form, and reduces the switching loss, and prevents breakage of FETs due to a high current. This function can be realized since the FETs can be turned on and off near the zero cross point of the sinusoidal-form current. The LC resonance circuit 4-4 may be provided on the primary side instead of the secondary side.

The FETs 4-2-1 through 4-2-4 of the low voltage side switching part 4-2 and the FETs 4-3-1 through 4-3-4 of the high voltage side switching part 4-3 are switching-controlled by a control circuit (not shown) including a CPU, etc. The capacitors 6 and 7 connected to the primary side and the secondary side are output smoothing capacitors.

Operations will be described with reference to FIG. 3. For bidirectional power conversion of the bidirectional DC-DC converter 4, the lower voltage side switching part 4-2 and the high voltage side switching part 4-3 are completely synchronized with each other by driving these by the same signal. This driving is performed by alternately turning on and off the pair of FETs 4-2-1 and 4-2-4 and the pair of FETs 4-2-2 and 4-2-3 in the low voltage side switching part 4-2, and alternately turning on and off the pair of FETs 4-3-1 and 4-3-4 and the pair of FETs 4-3-2 and 4-3-3 in the high voltage side switching part 4-3 as generally known.

When starting the engine, power conversion from the primary side to the secondary side of the bidirectional DC-DC converter 4 is performed, and the DC voltage of the battery 5 boosted by the power conversion is supplied to the driving inverter (rectifier circuit) 2. The driving inverter 2 converts this DC voltage into a three-phase AC voltage and applies it to the generator 1, and starts the generator as an engine starting motor. The starting of the engine is performed by PWM driving of the FETs 2-1 through 2-6 of the driving inverter as generally known. At this time, phase discrimination is performed by using a change in current distribution due to a counter electromotive voltage caused according to the operation of the generator (motor) 1, and synchronized driving can be performed under sensor-less control.

When the engine starts, the generator 1 is driven by the engine and generates a power output. The output of the generator 1 is rectified by the rectifier circuit (driving inverter) 2. At this time, the FETs 2-1 through 2-6 constituting the driving inverter are not driven, and the output of the generator 1 is full-wave-rectified by the rectifier elements D1 through D6 of the rectifier circuit 2. The output of the rectifier circuit 2 is smoothed and adjusted by the switching converter 3-1 of the inverse transformer 3, and further converted into an AC power with a predetermined frequency by the inverter 3-2 and outputted. DC regulation of the switching converter 3-1 is performed by PWM-modulating the FET 30.

When the remaining charge of the battery 5 is low, the battery 5 is charged by the output of the rectifier circuit 2 stepped down by the bidirectional DC-DC converter 4 as described based on FIG. 2. When only the output of the generator 1 cannot supply sufficient power to the load during an increase in load, power is also supplied from the battery 5 as well through the bidirectional DC-DC converter 4.

Thus, the bidirectional DC-DC converter 4 exchanges power between the primary side and the secondary side according to a relative voltage difference between the primary side and the secondary side due to the turns ratio of the transformer 4-1, and interchanges power therebetween.

Figure 1:
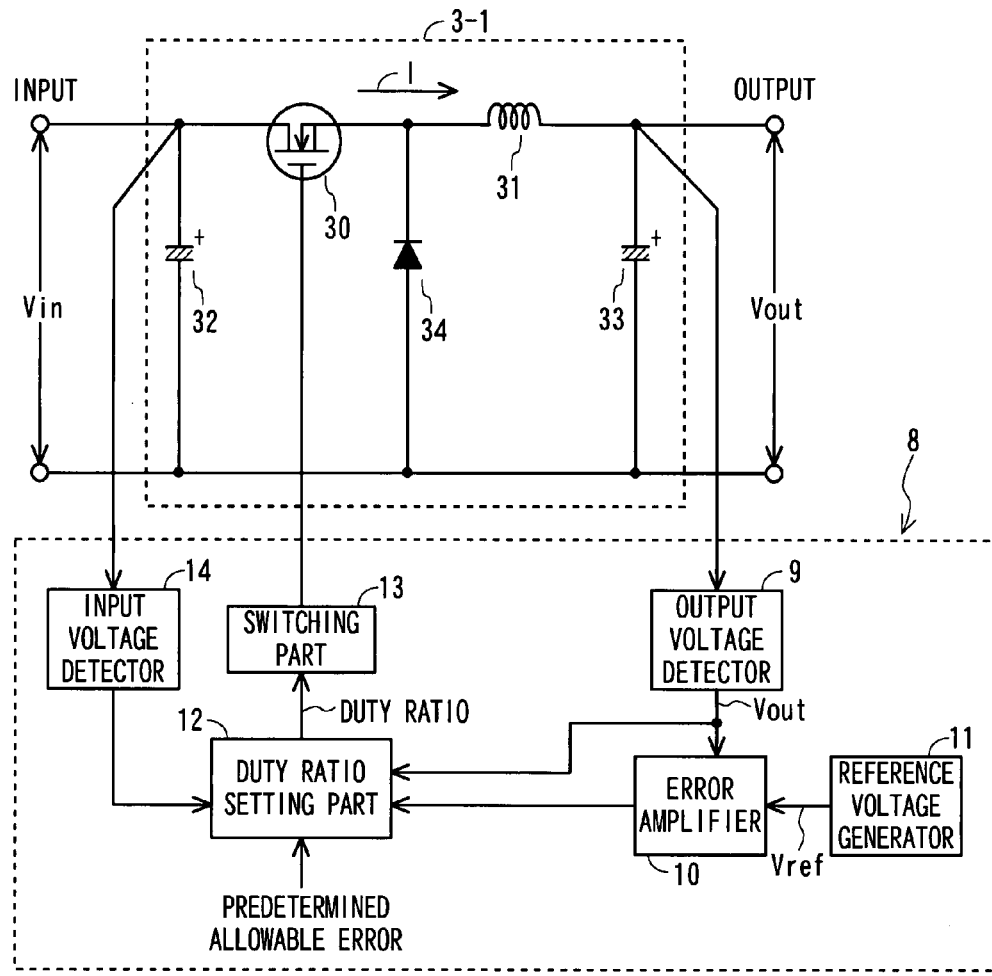
FIG. 1 is a block diagram of a voltage step-down switching converter according to an embodiment of the present invention.

Control of the switching converter 3-1 will be described. FIG. 1 is a block diagram of the switching converter 3-1 including a control part, and a component identical or equivalent to that in FIG. 3 is attached with the same reference numeral. In FIG. 1, the control part 8 includes an output voltage detector 9, an error amplifier 10, a reference voltage generator 11, a duty ratio setting part 12, a switching part 13, and an input voltage detector 14.

The output voltage detector 9 detects an output voltage Vout of the switching converter 3-1 and inputs it into the error amplifier 10. The reference voltage generator 11 inputs a reference voltage Vref for controlling the output voltage Vout into the error amplifier 10. The error amplifier 10 amplifies the deviation of the output voltage Vout from the reference voltage Vref and inputs it into the duty ratio setting part 12. The duty ratio setting part 12 supplies a duty ratio D (D=ON time $\Delta t$/carrier period T) determined so that the deviation comes in under an allowable error to the switching part 13. The switching part 13 drives the FET 30 according to this duty ratio D.

When the FET 30 is turned on in response to an instruction of the switching part 13, electrical energy is charged in the choke coil 31 due to a current I based on an input voltage Vin, and the capacitor 33 is also charged. On the other hand, when the FET 30 is turned off, the energy charged in the choke coil 31 and the capacitor 33 are released to the load side (inverter 3-2 side).

In this control of the duty ratio D of the FET 30, for protection of the FET 30, the input voltage Vin and the output voltage Vout of the switching converter 3-1 detected by the input voltage detector 14 are used. That is, the duty ratio of the FET 30 is determined so as to prevent an estimated current value I described later from exceeding a predetermined allowable current value Ip. It is also possible that the switching operation of the FET 30 is stopped when the estimated current value I reaches a predetermined range with respect to the allowable current value Ip so as to prevent the estimated current value I from exceeding the predetermined allowable current value Ip.

Figure 4:
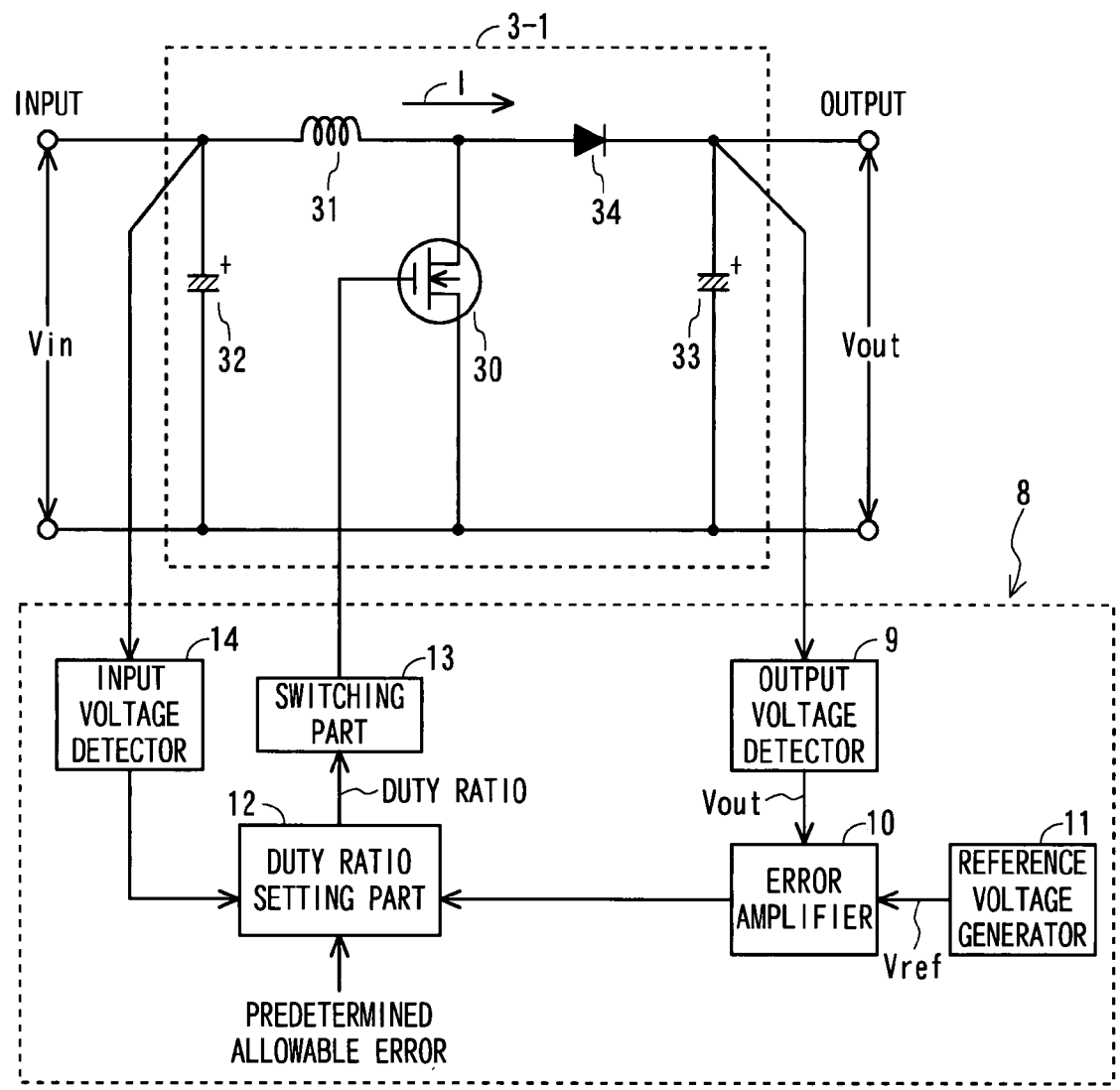
FIG. 4 is a block diagram of a voltage step-up switching converter according to an embodiment of the present invention.
Figure 5:
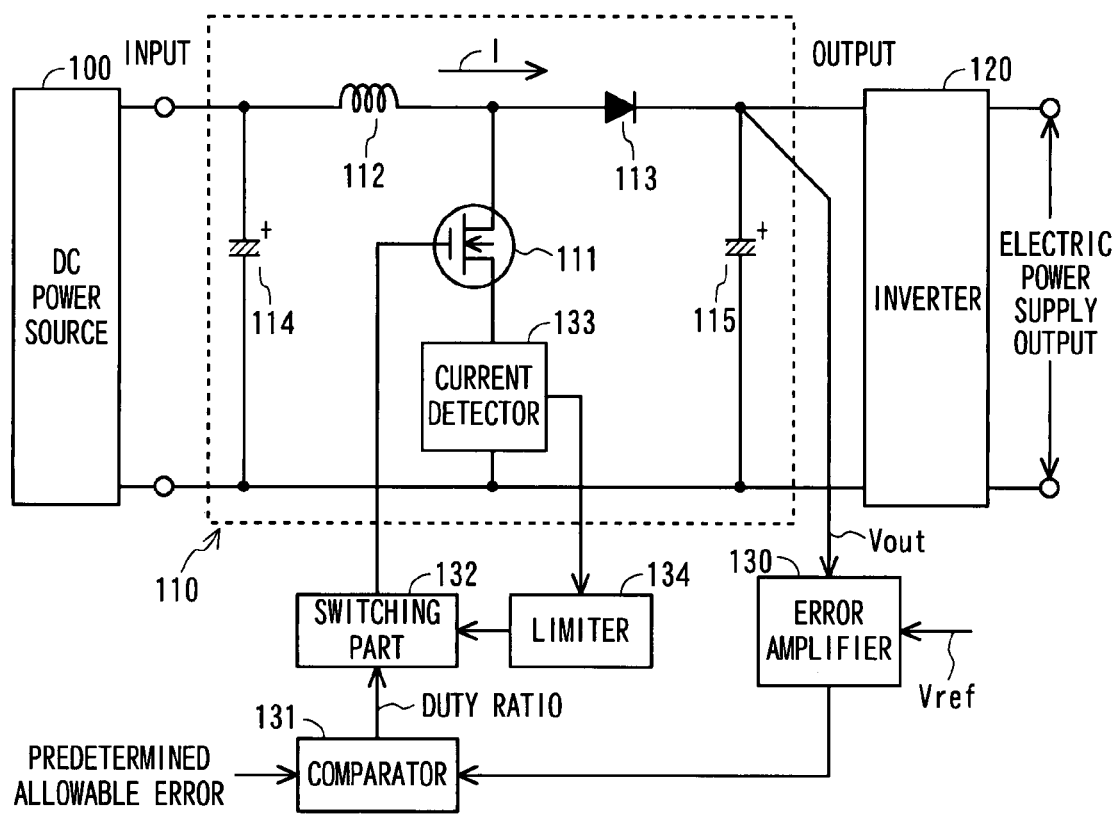
FIG. 5 is a block diagram of a switching converter according to a conventional technique.

FIG. 4 is a block diagram showing an example of the switching converter 3-1 constructed as a voltage step-up switching converter, and the same reference numeral as in FIG. 1 indicates an identical or equivalent component. The voltage step-up switching converter is different from the voltage step-down switching converter of FIG. 1 in that the FET 30 is connected in parallel to the choke coil 31 to boost the input voltage Vin to the output voltage Vout.

When the FET 30 is turned on, energy is charged in the choke coil 31 due to the voltage Vin inputted in the switching converter 3-1$a$ in this ON time $\Delta t$, and when the FET 30 is turned off, the energy is released via the diode 34. During this energy release, this energy is superimposed on the input voltage Vin and causes boosting action.

Also in this voltage step-up switching converter 3-1, a duty ratio D is determined so as to prevent an estimated current value I from exceeding an allowable current value Ip in the same manner as in the voltage step-down switching converter 3-1. In the voltage step-up switching converter 3-1, the estimated current value I can be estimated without using the output voltage Vout as described later.

In the voltage step-down and voltage step-up switching converters 3-1, to protect the FET 30, a calculation formula to estimate a current flowing in the FET 30 is shown below.

First, a calculation formula of an estimated current value in the voltage step-up switching converter 3-1 of FIG. 4 will be described. In the voltage step-up switching converter 3-1, an input voltage Vin is applied, and in the circuit in which the choke coil 31 has an inductance L, a current change $\Delta I$ of a current flowing in the FET 30 in the ON time $\Delta t$ is calculated from the following formula: $\Delta I = Vin/L \times \Delta t$ (Formula 1). The estimated current value I can be calculated from the following formula: $I = \Delta I + I-1$ (Formula 2) as a value obtained by adding the current change $\Delta I$ to the current estimated value I-1 of the previous switching of the FET 30. The ON time $\Delta t$ can be calculated from the following formula: $\Delta t = D \times T$ (Formula 3) by using a duty ratio D and a carrier period T. From these formulas, the current value flowing in the FET 30 when the FET 30 is driven at the duty ratio D can be estimated by using the following formula: $I = Vin/L \times D \times T$ (Formula 4).

By using this Formula 4, the FET 30 is driven according to the duty ratio D determined so as to prevent the current estimated value I from exceeding the allowable current value Ip. That is, at the timing when the current estimated value I falls within a predetermined range with respect to the allowable current value Ip, the duty ratio D is limited so as not to become greater, whereby the FET 30 is protected from overcurrent.

The FET 30 is also protected from overcurrent by stopping the driving of the FET 30 at the timing when the current estimated value I falls within the predetermined range with respect to the allowable current value Ip.

On the other hand, when the FET 30 is driven at the duty ratio D in the voltage step-down switching converter 3-1, the current change $\Delta I$ in the ON time $\Delta t$ is calculated from the following formula: $\Delta I = (Vin \times D - Vout)/L \times \Delta t$ (Formula 5) based on the input voltage Vin, the output voltage Vout, and the inductance L. The estimated current value I is obtained by adding the estimated current value I-1 of the previous switching of the FET 30 to the current change $\Delta I$, and therefore, as a result, the estimated current value I can be estimated from the following formula: $I = (Vin \times D - Vout)/L \times \Delta t + I-1$ (Formula 6). Also in the voltage step-down switching converter 3-1, in the same manner as in the step-up switching converter 3-1, the FET 30 is protected from overcurrent by driving the FET 30 according to a duty ratio D limited so as to prevent the current estimated value I from exceeding the allowable current value Ip or stopping the driving of the FET 30 at the timing when the current estimated value I falls within the predetermined range with respect to the allowable current value Ip.

Thus, according to the present embodiment, without providing a current detecting element, the FET 30 can be protected from overcurrent by using an estimated current value of the FET 30.

The invention claimed is:

1. A power unit which includes a DC power source and a switching converter that includes a switching element for turning on and off an input primary voltage from the DC power source and a reactor to be charged and discharged according to turning on and off of the switching element, and can adjust an output voltage by charging and discharging the reactor, comprising:

a detection means which detects the output voltage value, a duty setting means which decides a duty ratio so as to converge a difference between the output voltage value and a reference voltage value at a predetermined allowable value, a switching means which drives the switching element according to the duty ratio set by the duty setting means; and current value estimating means which estimates a current value flowing in the switching element by using the input primary voltage value, a duty ratio of the switching element, and an inductance of the reactor, wherein the switching means drives the switching element based on the estimated current value so as to prevent the estimated current value from becoming equal to or more than a predetermined allowable current value.

2. A power unit which includes a DC power source and a switching converter that includes a switching element for turning on and off an input primary voltage from the DC power source and a reactor to be charged and discharged according to turning on and off of the switching element, and can adjust an output voltage by charging and discharging the reactor, comprising:

a detection means which detects the output voltage value, a duty setting means which decides a duty ratio so as to converge a difference between the output voltage value and a reference voltage value at a predetermined allowable value, a switching means which drives the switching element according to the duty ratio set by the duty setting means; and current value estimating means which estimates a current value flowing in the switching element by using the input primary voltage value, a duty ratio of the switching element, and an inductance of the reactor, wherein the switching means stops the driving of the switching element based on the estimated current value when the estimated current value becomes equal to or more than a predetermined allowable current value.

3. The power unit according to claim 1 or 2, further comprising: an inverter which converts an output voltage of the switching converter into an alternating current with a predetermined frequency and outputs it to a load side.

4. The power unit according to claim 1 or 2, wherein
the switching converter is a voltage step-up switching converter, and
a current value I flowing in the switching element is estimated from $I=Vin/L \times D \times T$ by using the input voltage value Vin, an inductance L of the reactor, a carrier period T of the switching element, an ON time $\Delta t$ of the switching element, and an ON time duty ratio D (D=ON time $\Delta t$/carrier period T) of the switching element, and the ON time duty ratio D is controlled so as to prevent the estimated current value I from exceeding the allowable current value Ip.

5. The power unit according to claim 1 or 2, wherein
the switching converter is a voltage step-down switching converter, and
a current value I flowing in the switching element is estimated from $I=(Vin \times D-Vout)/L \times \Delta t + I-1$ by using the input voltage value Vin, an inductance L of the reactor, a carrier period T of the switching element, an ON time $\Delta t$ of the switching element, an ON time duty ratio D (D=ON time $\Delta t$/carrier period T) of the switching element, the output voltage value Vout, and a previous estimated current value I−1, and the ON time duty ratio D is controlled so as to prevent the estimated current value I from exceeding the allowable current value Ip.

6. The power unit according to claim 1 or 2, wherein the DC power source comprises an engine-driven generator and a rectifier for rectifying an output alternating current of this generator.

7. The power unit according to claim 3, wherein
the switching converter is a voltage step-up switching converter, and
a current value I flowing in the switching element is estimated from $I=Vin/L \times D \times T$ by using the input voltage value Vin, an inductance L of the reactor, a carrier period T of the switching element, an ON time $\Delta t$ of the switching element, and an ON time duty ratio D (D=ON time $\Delta t$/carrier period T) of the switching element, and the ON time duty ratio D is controlled so as to prevent the estimated current value I from exceeding the allowable current value Ip.

8. The power unit according to claim 3, wherein
the switching converter is a voltage step-down switching converter, and
a current value I flowing in the switching element is estimated from $I=(Vin \times D-Vout)/L \times \Delta t + I-1$ by using the input voltage value Vin, an inductance L of the reactor, a carrier period T of the switching element, an ON time $\Delta t$ of the switching element, an ON time duty ratio D (D=ON time $\Delta t$/carrier period T) of the switching element, the output voltage value Vout, and a previous estimated current value I−1, and the ON time duty ratio D is controlled so as to prevent the estimated current value I from exceeding the allowable current value Ip.

9. The power unit according to claim 3, wherein the DC power source comprises an engine-driven generator and a rectifier for rectifying an output alternating current of this generator.

10. The power unit according to claim 4, wherein the DC power source comprises an engine-driven generator and a rectifier for rectifying an output alternating current of this generator.

11. The power unit according to claim 5, wherein the DC power source comprises an engine-driven generator and a rectifier for rectifying an output alternating current of this generator.

* * * * *